Figure 6:
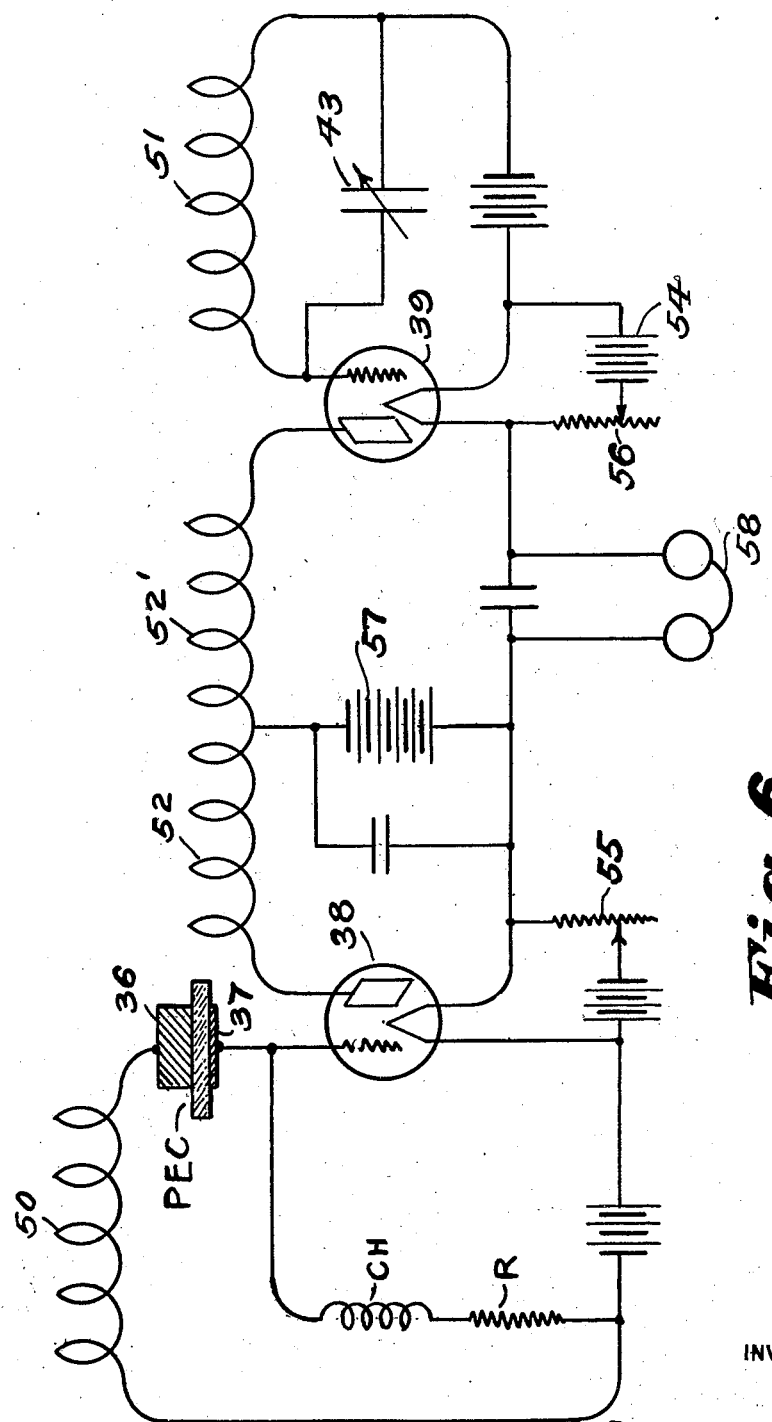

March 3, 1936.　　P. P. STOUTENBURGH　　2,032,381
METHOD AND APPARATUS FOR DETERMINING THE FORCE OF GRAVITY
Filed Dec. 16, 1927　　3 Sheets-Sheet 1
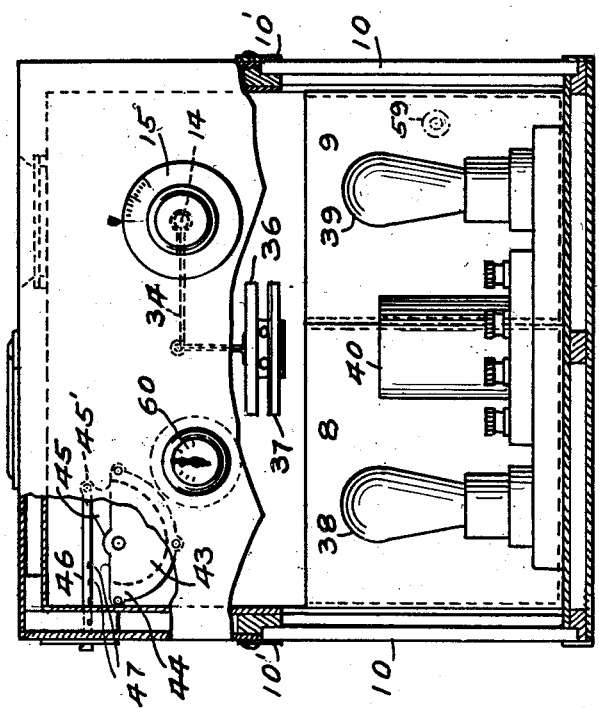
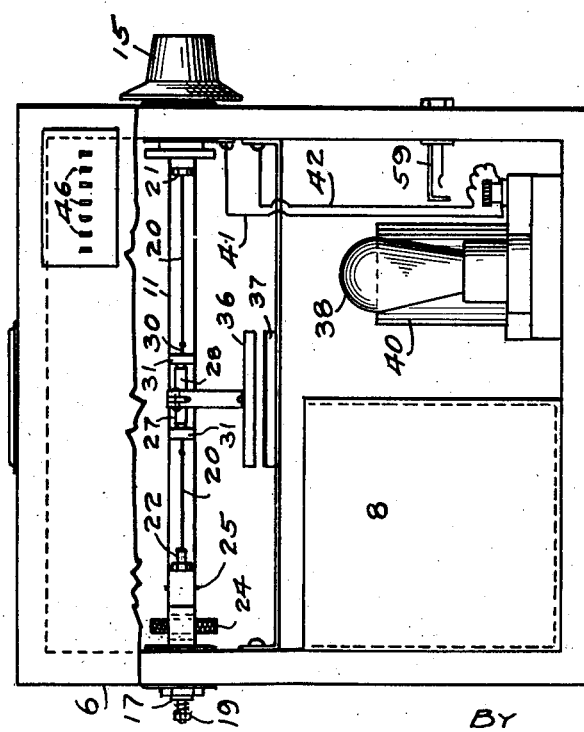
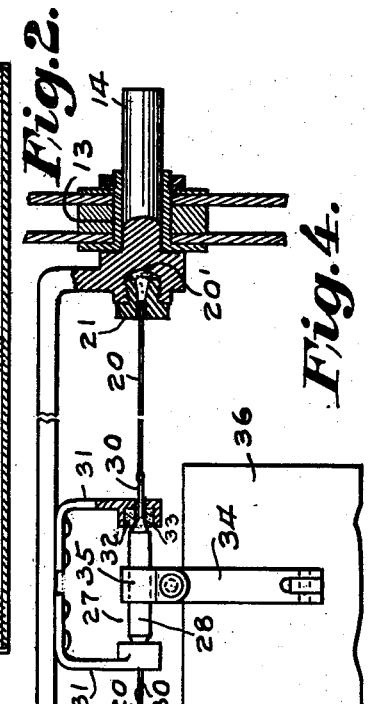
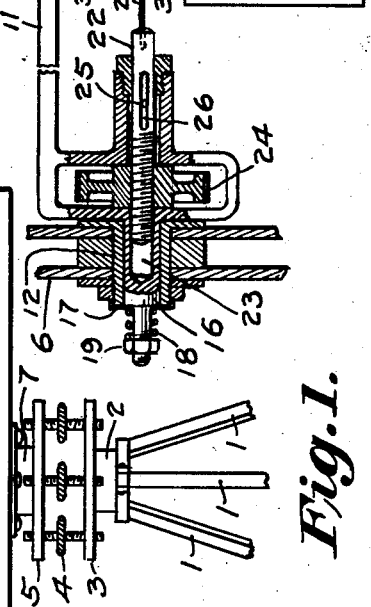
INVENTOR
PAUL P. STOUTENBURGH
BY
ATTORNEY March 3, 1936. P. P. STOUTENBURGH 2,032,381
METHOD AND APPARATUS FOR DETERMINING THE FORCE OF GRAVITY
Filed Dec. 16, 1927 3 Sheets-Sheet 2
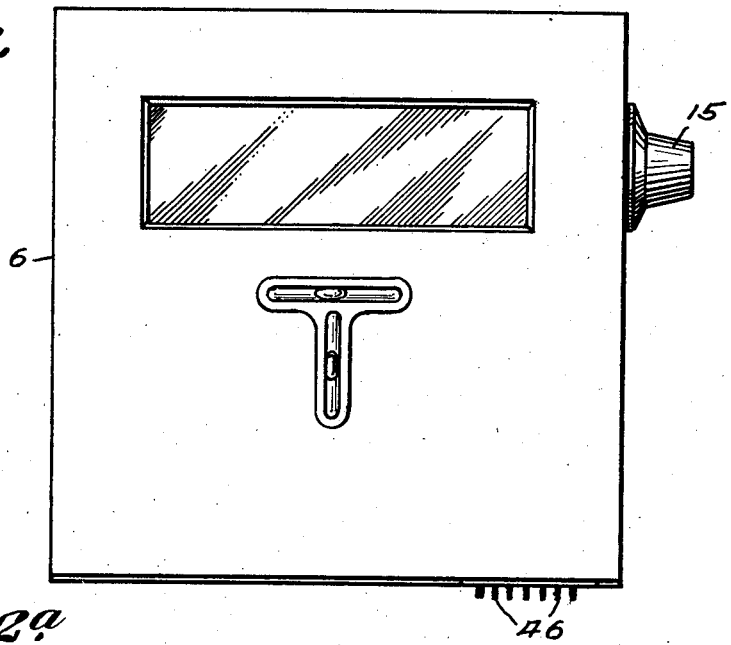
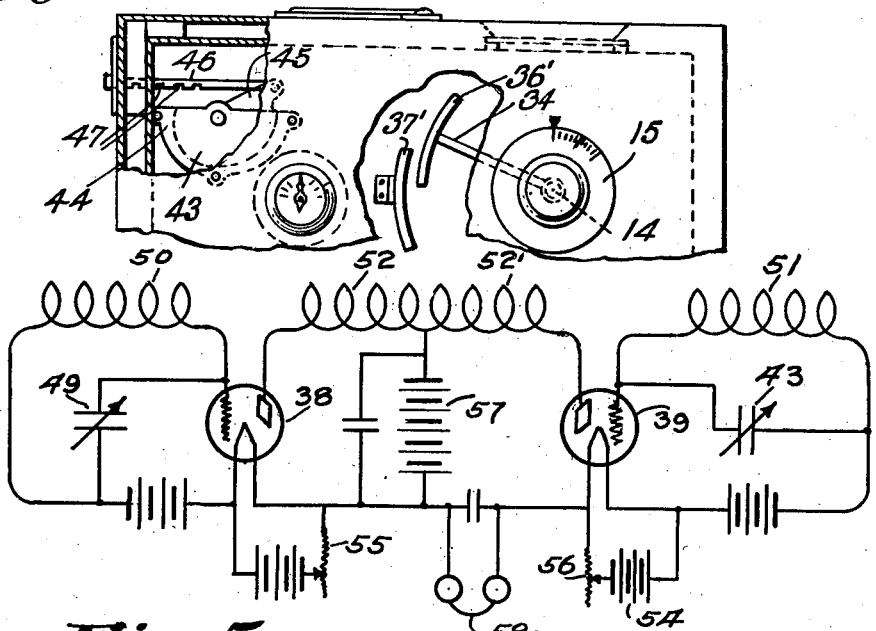
INVENTOR
PAUL P. STOUTENBURGH
BY
ATTORNEY Patented Mar. 3, 1936

2,032,381

UNITED STATES PATENT OFFICE 2,032,381

METHOD AND APPARATUS FOR DETERMINING THE FORCE OF GRAVITY

Paul P. Stoutenburgh, Washington, D. C.

Application December 16, 1927, Serial No. 240,446

3 Claims. (Cl. 177—351)

(Granted under the act of March 3, 1883, as
amended April 30, 1928; 370 O. G. 757)

The invention described herein may be manufactured and used by or for the Government of the United States for governmental purposes only without the payment to me of any royalty thereon.

My invention relates broadly to methods and apparatus for determining the relative density of the earth at points below the surface and more particularly to methods and apparatus for determining the presence of oil and ore deposits therein.

One object of my invention is to utilize the variable force of gravity existing in the area to be surveyed to vary the constants of an electrical circuit in such a manner that the frequency of a high frequency current generated therein may be measured and determined as a function of the force of gravity.

Another object of my invention is the provision of means for and method of measuring the relative changes in the force of gravity as an increasing mathematical function of the changes in the force of gravity as the force of gravity increases.

Further objects of my invention will appear more fully hereinafter as the description of the method and apparatus is developed.

It is well known, as determined by the activities of the geological surveys carried on by the British and United States Governments, that the force of gravity varies in proportion to the density of the major portion of the earth's crust directly below the point where the measurement is to be taken.

In the apparatus that I have developed I have utilized this principle to vary the frequency of a high frequency current and then measured the frequency of that current as a function of the force of gravity. Although I have shown a specific instrument for such a measurement, it is to be understood that many types of apparatus may be utilized within the scope of the appended method claims without departing from the spirit of my invention. Such an apparatus is one in which the frequency of an electrical current generated in a circuit controlled by a piezoelectric crystal is varied by the varying pressure exerted upon the crystal by the varying force of gravity.

My invention consists substantially in the construction, combination and arrangement of parts associated therewith or as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which:—

Figure 1 is a side elevational view of the instrument with the side of the cabinet broken away to show the internal arrangement of the parts, Figure 2 is a front elevational view showing the arrangement of instruments upon the cabinet panel as co-ordinated with the instruments shown in Figure 1, Figure 2a is a modification of the gravity sensitive elements shown in Figure 2, Figure 3 is a top plan view of the cabinet with the levelling gauges in position, Figure 4 is a detail structural view of the gravity sensitive element, Figure 5 is a circuit diagram of the electrical elements of the device, and Figure 6 is a circuit diagram embodying piezoelectric crystal means.

Referring particularly to Figure 1, numeral 1 designates the legs of a tripod, joined to a tripod head 2, which carries a plate 3. Into this plate head are threaded a plurality of levelling screws 4 which in turn are reversely threaded into a plate 5 that is secured to the cabinet 6 by means of an element 7. The levelling screws and the tripod head are similar to those used upon a transit tripod and function in a similar manner to level the cabinet as indicated upon the right angled levels positioned upon the cabinet as shown in Figures 1, 2, and 3.

The cabinet 7 is of portable size and is constructed of heat insulating material similar to that used in refrigerators. Within the cabinet that used in refrigerators. Within the cabinet I have formed a container 8 for the storage of ice or for apparatus capable of maintaining a fairly constant temperature within the cabinet. The walls of the container are such that the flow of currents of air within the cabinet will transfer heat therethrough.

Referring to Figure 2, I have also provided a compartment 9 within the cabinet for the storage of batteries which are to be connected to the electrical apparatus to be hereinafter described. Entrance is gained to the interior of the cabinet and to the compartments 8 and 9 through doors 10 hinged to the base of the cabinet and held in closed position by means of locks 10'.

In the upper portion of the cabinet I have provided the gravity sensitive element in a position shown in Figures 1 and 2. This device, shown in detail in Figure 4, consists of a shaft 11, the central portion of which is U shaped, and the outer ends of which rest in bearings 12 and 13 in the walls of the cabinet. The end 14 of the shaft extends through the wall of the cabinet and terminates in a dial 15 which may be calibrated in a manner hereinafter described. The other end 16 of the shaft extends through the wall of the cabinet and terminates in an adjustable friction member. This friction member consists of a friction plate 17 that is resiliently pressed against the end of the bearing 12 by means of a spring 18 and a nut 19 which is threaded upon the shaft.

Between the ends of the U shaped shaft and in alignment with the rotational axis thereof, I have provided a plurality of torsional members 20, the outer ends of which are affixed to the shaft. One end of one of the torsion members is clamped to the end 14 of the shaft 11 by means of a screw 21 which is threaded into the shaft in such a manner that it binds the enlarged end of the torsion member 20 against the end of the chamber 20' formed in the shaft.

One end of the other torsion member 20 is rigidly welded to a threaded member 22 which extends into a pocket 23 in the end 16 of the shaft 11. The member 22 is adjustable longitudinally of the axis of rotation of the shaft by means of a knurled thumb nut 24 that extends into a slot in the shaft and is threaded upon the member 22. The member 22 is fixed relative to any rotational movement with respect to the shaft 11 by means of a pin 25 which extends through the metal of the shaft and through a slot 26 in the member 22.

The inner ends of the torsional members 20 are rigidly affixed to a rotational member 27 which consists of a body portion 28, bearing surfaces 29 and minute pinions 30 upon each end of the body portion. The union between the torsional elements 20 and the ends of the pinions 30 may be made by welding or, in case other than metallic torsional elements are used, by mechanical means.

Mounted upon the U shaped portion of the shaft are two adjustable bearing braces 31 which carry jewelled bearings 32. These bearings have conical portions 33 which correspond to the conical bearing portion of the rotational member 27 and have holes extending from the apex of the conical bearing surfaces through the jewel of sufficient size that the pinions 30 may freely extend therethrough.

Upon the rotational member 27 I have provided an arm 34, which may be integral therewith, or clamped thereon by a clamping means 35 as shown. Upon the outer end of the arm, or suspended therefrom is a weight of large area and of such size that minute changes in the force of gravity will displace it from a position which is balanced by the torsional members 20. Beneath the position of rest of the weight 36 I have provided a flat plate 37 which forms a capacity condenser with the weight 36 when considered as electrically related. This plate has a thin coating of insulating material over its surface to prevent short circuiting of the condenser in the adjustment of the shaft 11 about its axis to regulate the torsion of the members 20.

I have arranged the plates as shown for the obvious reason that as the plate 36 approaches the plate 37 the increased electrical capacity is more than in the types wherein the relative movement between the plates is that of one over the other. However, it is to be understood that the operation of my invention is the same whether the plates 36, 37 are of the form shown in Fig. 2 or are curved as shown at 36', 37' of Figure 2a, the element 14 being the center of curvature of the plates 36', 37' and the center of rotation thereof.

In the lower portion of the cabinet and adjacent the battery compartment and the constant temperature compartment I have placed two vacuum tubes 38 and 39 with a radio frequency transformer 40 therebetween. This arrangement is merely optional for there are a variety of radio circuits which would be applicable to such a device without departing from the spirit of my invention.

The transformer 40 consists of two secondaries and two regenerative coils electrically connected to the tubes 38 and 39 in the manner shown in Figure 5. One of the secondaries is connected to the plates 36 and 37 by wires 41 and 42 as shown in Figure 1 as attached to the metallic elements supporting them. The other of the secondaries is shunted by a variable condenser 43.

The condenser 43 consists of a plurality of stator plates 44 arranged in a parallel frame and rigidly fastened together. The rotor plates 45 are rotatably mounted on a single shaft and movable with respect to each other and each consists of a straight line frequency plate which carries an arm 45' that is actuated by a plunger of insulating material 46 adjustable to a plurality of definite positions as indicated by the catches 47. The plates of this condenser are of such a size that when taken with the other constants of the apparatus, namely, the area of the plates 36 and 37, the value of the torsion members 20 and the value of the secondary across which they are shunted, the number of movable plates in active capacity relationship with the stator plates bears a certain relationship to the change in the value of gravity at that particular point.

Referring to Figure 5, the construction and operation of the device are as follows: The two vacuum tubes oscillators 38 and 39 are indicated diagrammatically with grids, filaments, and plates. The variable condenser 49 indicates the variable capacity between the plates 36 and 37. It is to be noted that the two secondaries 50 and 51 and the two regenerative coils 52 and 52' are wound upon one form and are mutually coupled together. Each of the filaments of the tubes 38 and 39 are supplied with heating current from batteries 53 and 54 through variable rheostats 55 and 56. The plates of the tubes 38 and 39 are supplied with current from a battery 57 through the regenerative coils 52 and 52'.

In Fig. 6, I have shown the same circuit arrangement as in Fig. 5 with the piezo-electric crystal PEC and its usual leak elements CH and R controlling the frequency generated in the circuits associated with the tube 38 as hereinbefore described. The plates 36 and 37 serve in this instance as electrodes for the piezo-electric crystal, 36 being the gravity sensitive element (shown as enlarged in cross section in the drawings) and 37 being the stationary element as described with reference to Figs. 2 and 2—A.

In order to ascertain the relative frequencies of the currents generated by the two oscillator systems I have provided a set of head telephones 58, for which I have supplied the usual telephone jack 59, in order that the zero beat determination of frequency may be applied. The variable condenser 43 is the same as that mentioned in the description of Figure 2 and constitutes the means for bringing the two high frequency currents generated by the two oscillator systems to the same frequency. It is to be understood that any modification of the circuits to utilize the same sources of power or the substitution of other means for determining the frequency of the currents generated is within the scope of the appended claims.

The constants of the inductances and capacities of the electrical circuit should be such that as the capacity between the plates 36 and 37 changes in a very small degree the resultant change in frequency of the current in the secondary 50 will be large. The size of the inductance 51 should be such that there must be a large change in the capacity of the condenser 43 to change the frequency of the current generated by the vacuum tube oscillator 39 to the same value as that generated by the vacuum tube oscillator 39.

Although different operators might choose different calibrations the one that I have found most useful is that in which the calibration of the dial 15 is such that the indices of the torsion elements may be maintained at a constant value even though the temperature within the cabinet should change as indicated by the temperature gauge 96, shown in Figure 2. As above mentioned the value of the condenser plates of the condenser 43 should be such that the number of rotor plates in active capacity relationship with the stator plates indicate a certain relative change in the force of gravity acting upon the movable plate 36.

In order that the plates 36 and 37 may not be attracted together it is to be noted that the frequency of the current generated in the two vacuum tube oscillators must be sufficiently removed from the resonant mechanical frequency of the gravity sensitive element that there will be no mechanical swinging of the device. However, with the frequency of the alternating current established at a value above 500 kilocycles the vibratory effect of the changing and discharging of the condenser plates appears to have no effect whatever upon the plates 36 and 37.

After the device has been calibrated in the following manner the procedure of operation is as follows:

The instrument is set up, and levelled, the plates 36 and 37 moved apart by the rotation of the dial 15 which produces a torsion upon the members 20, with the oscillator tubes both generating current and with a given number of the rotor plates of the condenser in active capacity relationship with the stator plates which setting gives a zero beat between the two high frequency currents as indicated by the head-telephones, the temperature within the cabinet is determined as indicated by the temperature sensitive element 60. The dial 15 is then rotated until zero beat between the two high frequency currents is again obtained. The calibration of the dial 15 is then made to correspond to the zero beat of the currents at any particular temperature.

With the value of gravity known at this particular point this setting of the condenser 43 corresponds to that value. The device is then moved to different places where the value of gravity is known and, for the particular temperature adjustment, the condenser 43 is varied until zero beat is again obtained between the two currents.

In the transportation of the device from place to place I have found it sufficient to lower the plates 36 and 37 together, they being insulated by the thin film of insulating material placed over the plate 37. However, any device which will clamp the weight 37 in any position during the transportation of the instrument so that the gravity sensitive element will not be injured by jarring is within the contemplated scope of my invention.

With the instrument calibrated, the device levelled and the procedure of the initial calibration repeated, the setting of the condenser 43 to obtain zero beat between the two high frequency currents will give an accurate evaluation of the force of gravity at that particular point.

In each of the foregoing instruments it will be seen that I have provided means for varying the electrical stress on a dielectric uniformly throughout the area of said dielectric, in the one instance the dielectric being air, the thickness of which is uniformly varied in accordance with the variations in the force of gravity and in the other the dielectric being the piezo-electric crystal and the stress thereon being uniformly distributed over the surface of said crystal. In each of these instances the variation in the stress is as a direct mathematical function of the force of gravity. In each of these instances there is a high frequency current generated, the frequency of which is determined by the stress in said dielectric and in each instance the frequency of the high frequency current generated, as a result of the change in stress in said dielectric, is measured.

In each of the three illustrative embodiments of my invention hereinbefore described the frequency of the current generated varies inversely as an increasing mathematical function—that is to say, the change in frequency increases at a rate greater than the rate of change in the force of gravity as the force of gravity becomes greater. In other words, the sensitivity of the devices becomes greater as the percentage change in the force of gravity becomes smaller. For example: As the instrument approaches an area where the force of gravity is greater the sensitivity of the instruments becomes greater, enabling the user to detect and measure with greater accuracy the decreasing percentage changes in the force of gravity.

It will be understood that the above description and accompanying drawings comprehend only the general and preferred embodiment of my invention and that minor detail changes in the construction and arrangement of parts may be made within the scope of the appended claims without sacrificing any of the advantages of my invention.

Having thus described my invention what I claim is:—

1. In a device of the class described, the combination of a fixed member, a torsion element, a gravity sensitive member attached to said torsion member, means for mounting the gravity sensitive member so that it tends to move toward said fixed member on increase in the force of gravity, means for relieving the torsion member of vertical and lateral loads created by the gravity sensitive member while permitting the transmission of torsional strain thereto, and means for indicating variations in the strain in said torsion element.

2. In an apparatus for determining the force of gravity, a piezo electric crystal, a gravity sensitive element associated with said crystal and arranged to mechanically stress said crystal as a function of the force of gravity, means for sustaining oscillations in said crystal which vary in frequency as a function of the mechanical stress applied to said crystal, and means for measuring the frequency of the oscillations sustained in said crystal to determine the force of gravity.

3. The method of determining the force of gravity over different areas, which comprises varying the mechanical stress applied to a piezo electric crystal as a function of the force of gravity, sustaining oscillations in said crystal which vary in frequency as a function of the mechanical stress applied to said crystal, and measuring the frequency of the oscillations sustained in said crystal to determine the force of gravity.

PAUL P. STOUTENBURGH.